United States Patent [19]
Heimann, Jr. et al.

[11] Patent Number: 5,823,158
[45] Date of Patent: Oct. 20, 1998

[54] ENGINE VALVE AND METHOD FOR MAKING THE SAME

[75] Inventors: Rudy J. Heimann, Jr., Brunswick; Victor D. Levin, Highland Heights; William Neumann, Lakewood; Joseph L. Palko, Strongsville; Robert E. Southam, Hudson, all of Ohio

[73] Assignee: TRW Inc., Lyndhurst, Ohio

[21] Appl. No.: 950,103

[22] Filed: Oct. 16, 1997

Related U.S. Application Data

[63] Continuation-in-part of Ser. No. 811,334, Mar. 4, 1997, Pat. No. 5,771,852.

[51] Int. Cl.$^6$ .................................................. F02M 3/00
[52] U.S. Cl. ............................... 123/188.3; 29/888.04
[58] Field of Search ..................... 123/188.3; 29/888.04

[56] References Cited

U.S. PATENT DOCUMENTS

| | | |
|---|---|---|
| 604,376 | 5/1898 | Egge . |
| 1,054,669 | 3/1913 | Bowen . |
| 2,371,548 | 3/1945 | Saffady . |
| 2,439,240 | 4/1948 | Cummings . |
| 4,166,372 | 9/1979 | Knight . |
| 4,423,616 | 1/1984 | Pease . |
| 4,597,367 | 7/1986 | Hayahsi . |
| 5,056,219 | 10/1991 | Iwase ..................................... 123/188.3 |
| 5,413,073 | 5/1995 | Larson et al. . |
| 5,458,314 | 10/1995 | Bonesteel . |
| 5,619,796 | 4/1997 | Larson et al. . |
| 5,655,493 | 8/1997 | Enright et al. ......................... 123/188.3 |
| 5,738,060 | 4/1998 | Colo et al. ............................. 123/188.3 |
| 5,771,852 | 6/1998 | Heimann, Jr. et al. ................ 123/188.3 |

FOREIGN PATENT DOCUMENTS

| | | |
|---|---|---|
| 126109 | 8/1984 | Japan . |
| 306212 | 12/1988 | Japan . |

*Primary Examiner*—John T. Kwon
*Attorney, Agent, or Firm*—Tarolli, Sundheim, Covell, Tummino & Szabo

[57] ABSTRACT

A first part of an engine valve (10) is centered on an axis (A) and comprises a hollow metal member (100) having an outwardly flared first end portion (102) and a second end portion (104). The hollow metal member (100) has a chamber (106) extending axially throughout the member. The chamber (106) is open at the first end portion (102). A second part of the engine valve (10) is centered on the axis (A) and comprises a metal piece (130) coaxial with the hollow metal member (100). The metal piece (130) has first and second ends (132 and 134). The first end (132) has a first weld connection to the second end portion (104) of the hollow metal member (100). The metal piece (130) has a solid cross-section portion between the first and second ends (132 and 134). The metal piece (130) has a circumferential groove (150) in the solid cross-section portion. A metal cap (160) has a periphery (166) and a second weld connection (172) at the periphery to the outwardly flared first end portion (104) of the hollow metal member (100). The cap (160) closes the chamber (106) of the hollow metal member (110) at the flared first end portion (104). An inner surface (162) of the cap (160) is conical in shape and tapers axially away from the hollow metal member (100) as the inner surface (162) extends from the periphery (166) toward the axis (A). The cap (160) has an outer surface (164) which is conical in shape and tapers axially away from the hollow metal member (100) as the outer surface (164)) extends from the periphery (166) toward the axis (A).

16 Claims, 3 Drawing Sheets

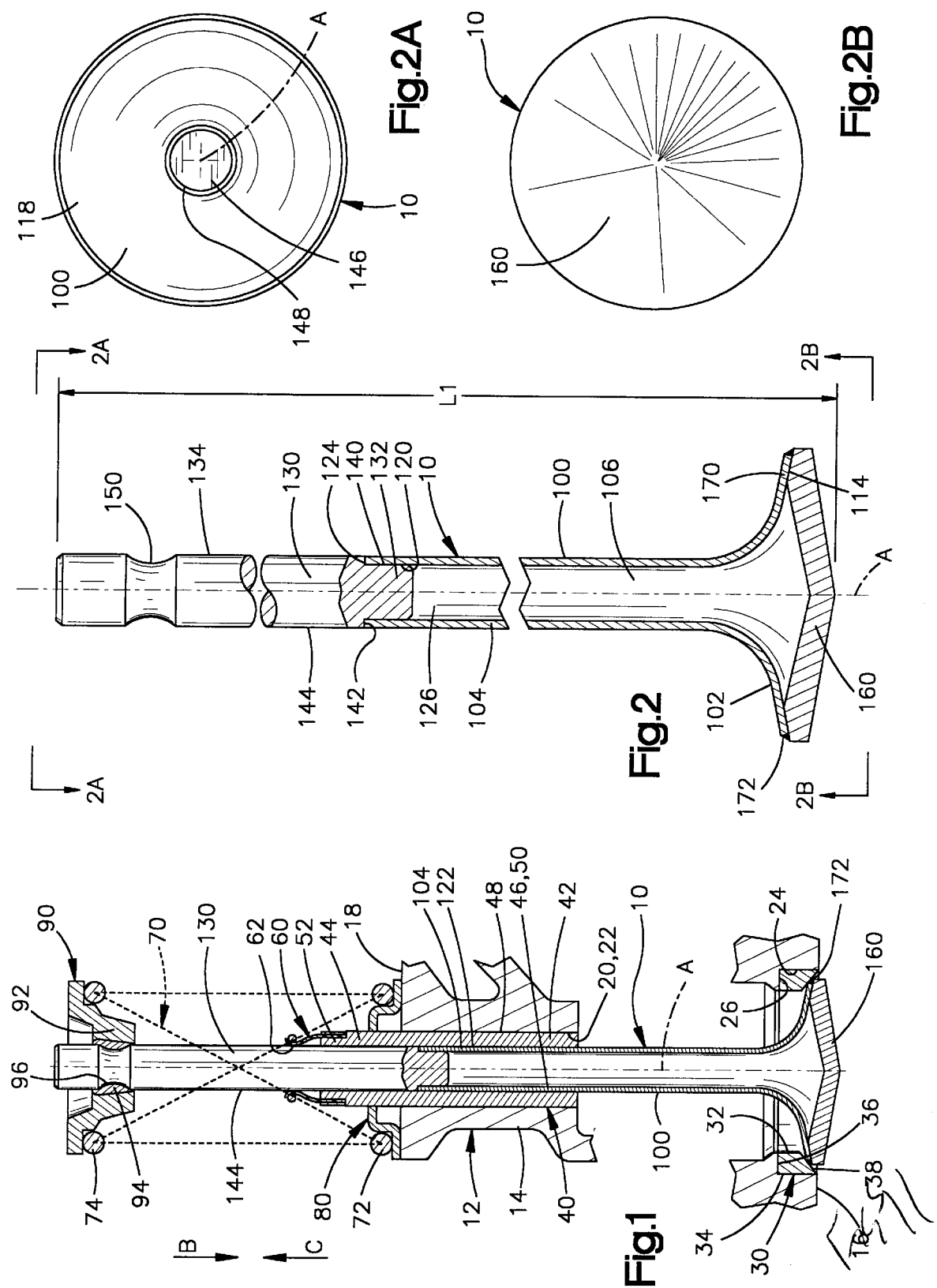

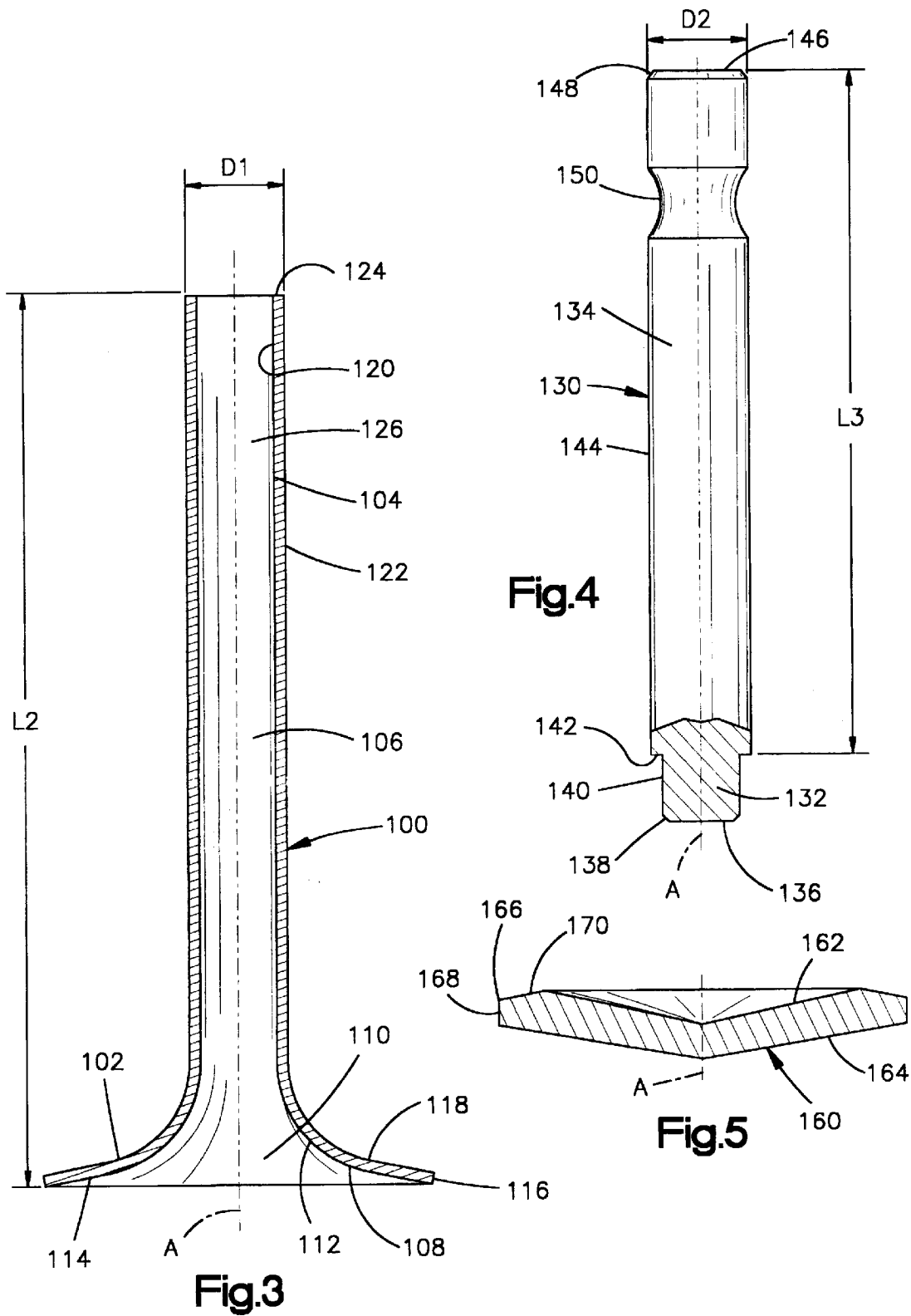

ས5,823,158

ENGINE VALVE AND METHOD FOR MAKING THE SAME

RELATED APPLICATION

This application is a continuation-in-part of United States patent application Ser. No. 08/811,334, filed Mar. 4, 1997, entitled "Poppet Valve with Embossed Neck Structure" now U.S. Pat. No. 5,771,852.

TECHNICAL FIELD

The present invention relates to a reciprocating engine valve for use in an internal combustion engine and to a method of making the engine valve.

BACKGROUND OF THE INVENTION

Reciprocating engines valves, or poppet valves, for use in internal combustion engines are known. Poppet valves are used as both intake and exhaust valves. Such valves must be able to withstand relatively high temperatures and be durable. Also, it is desirable that the valves be relatively light in weight.

One known valve has a solid construction made by forging and/or machining. Another known valve has a hollow construction made by extruding or drilling the valve stem to form a chamber in the valve in order to reduce weight. Still another known valve has a hollow construction made by deep drawing to form a chamber in the valve in order to reduce weight. It is also known to fill the chamber in the valve with a coolant such as sodium.

SUMMARY OF THE INVENTION

The present invention is an internal combustion engine valve to be reciprocated in a valve guide in an engine. The valve comprises a valve stem centered on an axis and comprising first and second parts. The first part comprises a hollow metal member having an outwardly flared first end portion and a second end portion. The hollow metal member has a chamber extending axially throughout the member. The chamber comprises a flared chamber portion defined by the first end portion and a cylindrical chamber portion defined by the second end portion. The chamber is open at the first end portion. The hollow metal member is one piece of homogenous material.

The second part comprises a metal piece coaxial with the hollow metal member. The metal piece has first and second ends. The first end has a first weld connection to the second end portion of the hollow metal member. The second end is spaced from the hollow metal member. The metal piece has a solid cross-section portion between the first and second ends and has a circumferential groove in the solid cross-section portion. The metal piece is one piece of homogenous material.

The valve further comprises a metal cap centered on the axis and coaxial with the hollow metal member. The cap has a periphery and a second weld connection at the periphery to the outwardly flared first end portion of the hollow metal member. The cap closes the flared chamber portion of the hollow metal member at the flared first end portion and has an inner surface facing into the chamber. The inner surface of the cap is conical in shape and tapers axially away from the hollow metal member as the inner surface extends from the periphery toward the axis. The cap has an outer surface which is conical in shape and tapers axially away from the hollow metal member as the outer surface extends from the periphery toward the axis. The metal cap is one piece of homogenous material.

In accordance with one feature of the present invention, the length of the hollow metal member and the length of the metal piece are selected so that the first weld connection is always located in the valve guide.

Further, the engine valve is preferably made by a method which involves deep drawing the hollow metal member into a shape having a closed end and punching out the closed end to provide the chamber with an open second end portion.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic sectional view of an engine valve constructed in accordance with the present invention installed in an internal combustion engine;

FIG. 2 is an enlarged view of the engine valve of FIG. 1;

FIG. 2A is a view taken along line 2A—2A in FIG. 2;

FIG. 2B is a view taken along line 2B—2B in FIG. 2;

FIG. 3 is a view of one component of the engine valve in FIG. 2;

FIG. 4 is a view of another component of the engine valve of FIG. 2;

FIG. 5 is a view of yet another component of the engine valve of FIG. 2;

DESCRIPTION OF PREFERRED EMBODIMENT

Figure 6:
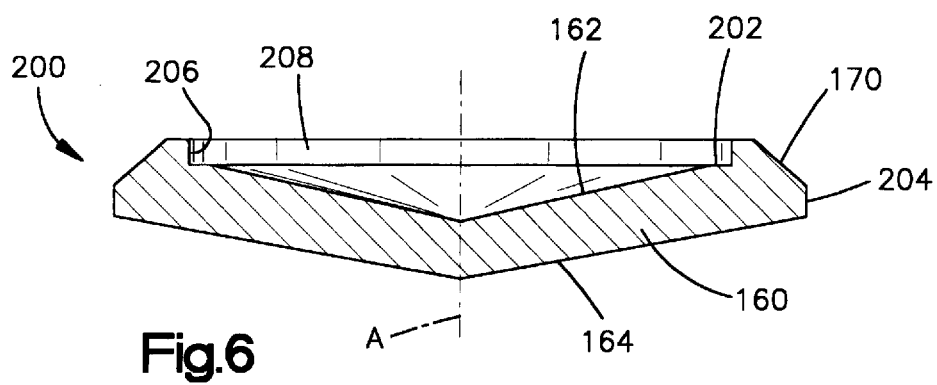
FIG. 6 is a view similar to FIG. 5 illustrating a portion of an engine valve constructed in accordance with a second embodiment of the present invention.

The present invention is a reciprocatable engine valve for use in an internal combustion engine. The present invention is applicable to various internal combustion engine applications. As representative of one such application, FIG. 1 illustrates an engine valve 10 in an internal combustion engine 12.

The engine 12 includes a cylinder head 14. The cylinder head 14 is made of metal and has inner and outer surfaces 16 and 18, respectively. The inner surface 16 defines a combustion chamber (not shown) in the cylinder head 14. The cylinder head 14 includes a first cylindrical surface 20 centered on an axis A. The first cylindrical surface 20 extends downward from the outer surface 18 in the direction indicated by arrow B in FIG. 1. The first cylindrical surface 20 defines a bore 22 through the cylinder head 14. In a portion of the cylinder head 14 axially spaced from the bore 22, a second cylindrical surface 24 extends upward from the inner surface 16 in the direction indicated by arrow C in FIG. 1. The second cylindrical surface 24 is centered on the axis A and intersects a radially extending surface 26 to define a recess (not numbered) in the inner surface 16 of the cylinder head 14.

An annular valve seat 30 is fixedly secured in the recess in the inner surface 16 of the cylinder head 14. The valve seat 30 is centered on the axis A and is made of metal. The valve seat 30 has parallel, cylindrical inner and outer surfaces 32 and 34, respectively. The cylindrical outer surface 34 of the valve seat 30 abuts the second cylindrical surface 24 of the cylinder head 14. The valve seat 30 includes an annular surface 36 and a valve seating surface 38 extending between the inner and outer surfaces 32 and 34. The annular surface 36 of the valve seat 30 abuts the radially extending surface 26 of the cylinder head 14. The valve seating surface 38 is conical in shape and tapers radially inward toward the axis A from the cylindrical outer surface 34 of the valve seat 30.

The cylinder head 14 includes an annular valve guide 40 fixedly attached to the cylinder head 14 and partially disposed in the bore 22 through the cylinder head. The valve guide 40 is centered on the axis A and is made of metal. The valve guide 40 includes a central portion 42 and an end portion 44. The central portion 42 has parallel, cylindrical inner and outer surfaces 46 and 48, respectively. The outer surface 48 of the valve guide 40 abuts the first cylindrical surface 20 in the cylinder head 14. The inner surface 46 defines a cylindrical passage 50 through the valve guide 40. The end portion 44 of the valve guide 40 extends beyond the bore 22 in the cylinder head 14 in the direction of arrow C. The end portion 44 includes an axial extension 52 having a smaller outer diameter than the outer diameter of the central portion 42.

An annular valve seal 60 encircles the axial extension 52 in the end portion 44 of the valve guide 40. The valve seal 60 includes a finger portion 62 which extends axially beyond the terminal end of the axial extension 52 in the direction of arrow C. The finger portion 62 sealingly engages the engine valve 10.

The cylinder head 14 further includes a valve spring 70, a spring mount 80, and a spring retainer 90. The valve spring 70 encircles the engine valve 10 and preferably comprises a helical compression spring. The valve spring 70 has first and second end portions 72 and 74, respectively. The first end portion 72 of the valve spring 70 engages the spring mount 80. The second end portion 74 of the valve spring 70 engages the spring retainer 90.

The spring mount 80 is an annular part attached to the outer surface 18 of the cylinder head 14. The spring mount 80 is centered on the axis A and encircles the end portion 44 of the valve guide 40.

The spring retainer 90 is also an annular part centered on the axis A. The spring retainer 90 has a hub portion 92 which includes an annular lock member (or collet) 94. The lock member 94 is wedged between the hub portion 92 of the spring retainer 90 and the valve 10. The lock member 94 has a radially inwardly extending rounded configuration indicated by reference numeral 96 in FIG. 1. The lock member 94 could have configurations other than rounded.

The engine valve 10 is partially disposed in the valve guide 40. Further, the valve 10 engages both the lock member 94 of the spring retainer 90 and the valve seat 30. The engine valve 10 is centered on the axis and has an overall length L1 (FIG. 2).

The engine valve 10 comprises three components; namely, a tubular body member 100, a stem member 130, and a cap member 160 (FIGS. 1 and 2).

The tubular body member 100 of the engine valve 10 is a hollow one piece part made of a homogeneous metal, for example, stainless steel. The tubular body member 100 has a length L2 (FIG. 3). The body member 100 includes a radially outwardly flared first end portion 102 and a cylindrical second end portion 104. The outwardly flared first end portion 102 and the second end portion 104 of the body member 100 have the same nominal wall thickness throughout their extent, although the actual wall thickness may vary slightly due to the manufacturing process used to make the body member.

A chamber 106 extends axially throughout the body member 100 and is open at both the first and second end portions 102 and 104. The body member 100 is preferably made by deep drawing a metal disk to form the outwardly flared first end portion 102 and a closed end (not shown) in the second end portion 104. The closed end is subsequently punched out.

The outwardly flared first end portion 102 of the body member 100 includes a flared inner surface 108 defining a flared chamber portion 110 of the chamber 106 in the body member. The flared inner surface 108 has an arcuate surface portion 112 and a conical surface portion 114. A perimeter surface 116 connects the conical surface portion 114 of the flared inner surface 108 with a flared outer surface 118 in the first end portion 102 of the body member 100.

The second end portion 104 of the body member 100 includes parallel, cylindrical inner and outer surfaces 120 and 122, respectively. An annular end surface 124 extends between the inner and outer surfaces 120 and 122. The inner surface 120 defines a cylindrical chamber portion 126 of the chamber 106 in the body member 100. The outer surface 122 has a diameter D1. A portion of the outer surface 122 in the second end portion 104 of the body member 100 slidingly engages the inner surface 46 defining the passage 50 through the valve guide 40.

The stem member 130 of the engine valve 10 is generally cylindrical in shape and is centered on the axis (FIGS. 2 and 4). The stem member 130 has a one piece construction and is made of metal, for example, stainless steel. The stem member 130 has a length L3 which is 5% to 50% of the overall length L1 of the valve 10. The stem member 130 has first and second ends 132 and 134, respectively. The stem member 130 has a solid cross-section between the first and second ends 132 and 134.

The first end 132 of the stem member 130 has a radially extending first end surface 136, a first chamfered surface 138, a first cylindrical surface 140, and a first annular surface 142. The first chamfered surface 138 extends between the first end surface 136 and the first cylindrical surface 140. The chamfered surface 140 may be eliminated, if desired.

The first end 132 of the stem member 130 is disposed in the cylindrical chamber portion 126 in the second end portion 104 of the body member 100. The first cylindrical surface 140 in the first end 132 of the stem member 130 abuts the cylindrical inner surface 120 in the second end portion 104 of the body member 100. The first annular surface 142 in the first end 132 of the stem member 130 abuts the annular end surface 124 in the second end portion 104 of the body member 100. The stem member 130 and the body member 100 are fixedly secured to one another at the abutting surfaces 140, 142 and 120, 124 of the stem member and the body member, respectively, by friction welding, laser welding, or another suitable welding technique.

The second end 134 of the stem member 130 has a second cylindrical surface 144 which connects with the first annular surface 142 in the first end 132 of the stem member 130. The second cylindrical surface 144 has a diameter D2 which is equal to the diameter D1 of the second end portion 104 of the body member 100. A portion of the second cylindrical surface 144 slidingly engages the inner surface 46 defining the passage 50 through the valve guide 40. The second cylindrical surface 144 is also engaged by the finger portion 62 of the valve seal 60.

The second end 134 of the stem member 130 includes a radially extending second end surface 146 and a second chamfered surface 148 (FIGS. 2A and 4). The second chamfered surface 148 extends between the second radially extending end surface 146 and the second cylindrical surface 144. The second end 134 of the stem member 130 further includes a radially inwardly extending continuous circumferential groove 150. The groove 150 is located in a solid cross section portion of the stem member 130. The circumferential groove 150 is rounded as shown in FIG. 4. The circumferential groove 150 could have other configurations. The rounded configuration 96 of the lock member 94 in the spring retainer 90 is disposed in the circumferential groove 150 in the second end 134 of the stem member 130.

The cap member 160 of the engine valve 10 is a one piece part made a homogeneous metal material, for example, stainless steel. The cap member 160 is disk-shaped and is fixedly attached to the flared first end portion 102 of the body member 100 (FIGS. 2 and 2B). The cap member 160 is centered on the axis A and is made of one piece of a homogeneous metal, preferably stainless steel. The cap member 160 has conical inner and outer surfaces 162 and 164 (FIG. 5), respectively, which are connected by a periphery 166. The conical inner and outer surfaces 162 and 164 taper axially away from the body member 100 as the surfaces 162, 164 extend from the periphery 166 of the cap member 160 toward the axis A. The conical inner surface 162 faces into the chamber 106 in the body member 100 and closes the open flared chamber portion 110 of the chamber.

The periphery 166 of the cap member 160 includes an axially extending surface 168 and a third conical surface 170. The third conical surface extends between the axially extending surface 166 and the conical inner surface 162. The third conical surface 170 tapers toward the conical outer surface 164 as it extends away from the conical inner surface 162. The third conical surface 170 abuts the conical surface portion 114 of the flared inner surface 108 of the body member 100. A hard facing weld 172 (FIG. 2) connects the perimeter surface 116 in the flared first end portion 102 of the body member 100 with the third conical surface 170 of the cap member 160. The weld 172 joining the cap member 160 and the body member 100 moves in and out of the contact with the conical surface 38 of the valve seat 30 when the valve 10 is reciprocated by the engine 12 as described below.

In operation, the second end surface 146 of the stem member 130 of the engine valve 10 is contacted by a part of the engine 12, such as a rocker arm or other mechanisms (not shown), and caused to move successively up and down in the direction of arrows C and B in FIG. 1 in a reciprocating motion. FIG. 1 illustrates the engine valve 10 in a closed position in which the valve is seated against the valve seat 30 to prevent gas from entering or leaving the combustion chamber in the cylinder head 14. When the engine valve 10 is moved downward in the direction of arrow B, the valve moves out of contact with the valve seat 30 to allow gas flow in or out of the combustion chamber in the cylinder head 14.

The valve guide 40 supports the reciprocating movement of the engine valve 10 by encircling the valve and slidingly engaging the body member 100 and the stem member 130 of the valve. The valve seal 60 prevents oil leakage into the combustion chamber.

The engine valve 10 described above has several advantageous features. First and foremost, the hollow design of the engine valve 10 makes the valve light in weight. The light weight of the valve 10 increases the fuel economy of the engine 12 and makes the valve easier to operate. Second, the solid construction of the stem member 130 in the valve 10 provides durability and good wear characteristics. Third, the construction of the tubular member 100, the solid stem member 130, and the cap member 160 provide the valve 10 with a high strength to weight ratio. Fourth, the length L3 of the stem member 130 relative to the overall length L1 of the valve 10 may be selected so that the junction between the stem member 130 and the body member 100 is always contained within the valve guide 30. This protects the valve stem seal 60 from excessive temperature conditions. Also, the valve guide 30 thus will provide additional support for the junction of the stem member 130 and the body member 100 and makes the valve 10 less likely to bend under side loads.

FIG. 6 illustrates a portion of an engine valve 200 according to a second embodiment of the present invention. In the embodiment of FIG. 6, reference numbers identical to those of the embodiment of FIGS. 1–5 are used to designate features of the engine valve 200 which are identical to features of the engine valve 10 of FIGS. 1–5.

The cap member 160 of the engine valve 200 includes first and second annular surfaces 202 and 204, respectively, and an axial surface 206 facing into the flared chamber portion 110 of the body member 100. The first annular surface 202 extends radially and connects the conical inner surface 162 with the axial surface 206. The second annular surface 204 extends axially and connects the conical outer surface 164 with the third conical surface 170. The first annular surface 202 and the axial surface 206 together define an annular recess 208 for receiving the flared first end portion 102 of the body member 100. The perimeter surface 116 in the flared first end portion 102 of the body member 100 abuts the axial surface 206 in the cap member 160 and the two parts are then welded together, preferably by laser welding. The abutting surfaces 116 and 206 of the body member 100 and the cap member 160, respectively, provide additional strength to the weld joining the body member and the cap member.

Figures 7, 8, 9:
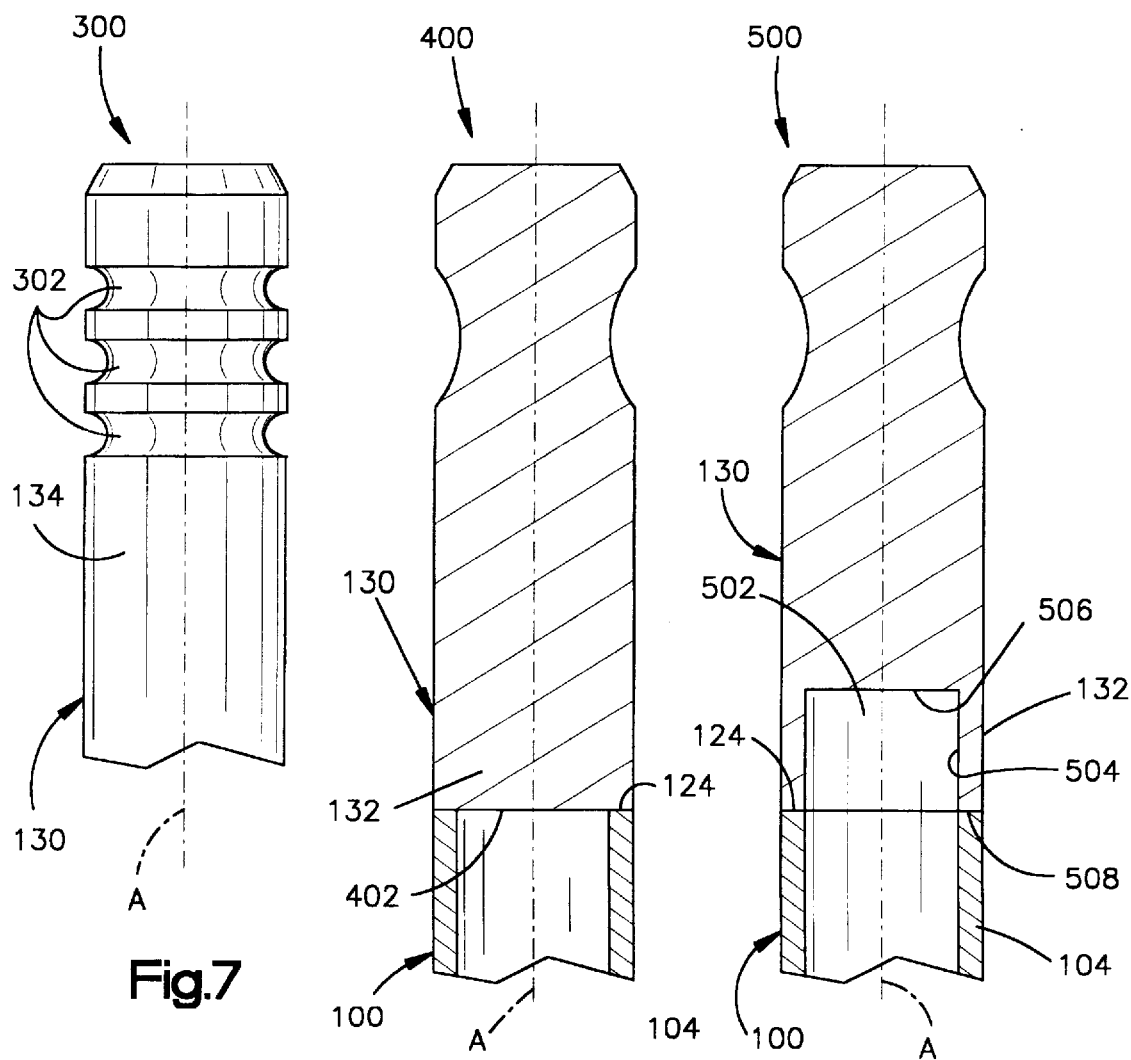
FIG. 7 is an enlarged view of a portion of an engine valve illustrating a third embodiment of the present invention.
FIG. 8 is a view similar to FIG. 7 illustrating a portion of an engine valve constructed in accordance with a fourth embodiment of the present invention.
FIG. 9 is a view similar to FIG. 8 illustrating a portion of an engine valve constructed in accordance with a fifth embodiment of the present invention.

FIG. 7 illustrates a portion of an engine valve 300 according to a third embodiment of the present invention. In the embodiment of FIG. 7, reference numbers identical to those of the embodiment of FIGS. 1–5 are used to designate features of the engine valve 300 which are identical to features of the engine valve 10 of FIGS. 1–5.

The second end 134 of the stem member 130 of the engine valve 300 has a series of axially spaced, continuous circumferential grooves 302. The grooves 302 are formed in the solid cross-section portion of the stem member 130. The series of grooves 302 mate with a corresponding number of rounded configurations present on a lock member of a spring retainer (not shown). Although three grooves 302 are illustrated in FIG. 7, the number of grooves can be tailored to the application. The solid cross-section of the stem member 130 provides the strength necessary to allow the series of grooves 302 to be formed in the stem member without distorting the stem member.

FIG. 8 illustrates a portion of an engine valve 400 according to a fourth embodiment of the present invention. In the embodiment of FIG. 8, reference numbers identical to those of the embodiment of FIGS. 1–5 are used to designate features of the engine valve 400 which are identical to features of the engine valve 10 of FIGS. 1–5.

The axially projecting first end 132 of the stem member 100 of the engine valve 10 in the first embodiment is omitted from the engine valve 400 such that only a radially extending first end surface 402 is present. The radially extending first end surface 402 is friction or laser welded to the annular end surface 124 in the second end portion 104 of the body member 100.

In the embodiment of FIG. 8, the end portion 104 of the body member 100 is illustrated as open. However, the end portion 104 could be closed by a metal end wall formed in the deep drawing process, which metal end wall is not punched out. In such a case, the end surface 402 of the stem member 130 would be welded to the metal end wall.

FIG. 9 illustrates a portion of an engine valve 500 according to a fifth embodiment of the present invention. In the embodiment of FIG. 9, reference numbers identical to those of the embodiment of FIG. 8 are used to designate features of the engine valve 500 which are identical to features of the engine valve 400 of FIG. 8.

The first end 132 of the stem member 130 of the engine valve 500 has a cylindrical cavity 502 defined by an axial surface 504 and a radial surface 506. The cavity 502 is centered on the axis A. An annular end surface 508 is friction or laser welded to the annular second end surface 124 in the second end portion 104 of the body member 100. The engine valve 500 according to the fifth embodiment may further reduce the weight of the valve as compared to the valve 400 of FIG. 8.

A further embodiment of the present invention has a coolant, preferably metallic sodium, placed into the chamber 106 in the hollow tubular members 100 of the engine valves 10, 200, 300, 400, 500 described above. The sodium acts a coolant and improves the performance of the valves 10, 200, 300, 400, 500 as is known in the art.

From the above description of the invention, those skilled in the art will perceive improvements, changes and modifications. Such improvements, changes and modifications within the skill of the art are intended to be covered by the appended claims.

Having described the invention, we claim:

1. An internal combustion engine valve to be reciprocated in a valve guide in an engine, said valve comprising:

a valve stem centered on an axis and comprising first and second parts, said first part comprising a hollow metal member having an outwardly flared first end portion and a second end portion, said hollow metal member having a chamber extending axially throughout said member, said chamber comprising a flared chamber portion defined by said first end portion and a cylindrical chamber portion defined by said second end portion, said chamber being open at said first end portion, said hollow metal member being one piece of homogenous material, said second part comprising a metal piece coaxial with said hollow metal member, said metal piece having first and second ends, said first end having a first weld connection to said second end portion of said hollow metal member, said second end being spaced from said hollow metal member, said metal piece having a solid cross-section portion between said first and second ends, said metal piece having a circumferential groove in said solid cross-section portion, said metal piece being one piece of homogenous material; and a metal cap centered on said axis and coaxial with said hollow metal member, said cap having a periphery and a second weld connection at said periphery to said outwardly flared first end portion of said hollow metal member, said cap closing said flared chamber portion of said hollow metal member at said flared first end portion and having an inner surface facing into said chamber, said inner surface of said cap being conical in shape and tapering axially away from said hollow metal member as said inner surface extends from said periphery toward said axis, said cap having an outer surface which is conical in shape and tapering axially away from said hollow metal member as said outer surface extends from said periphery toward said axis, said metal cap being one piece of homogenous material.

2. A valve as defined in claim 1 wherein said metal piece has an axial length which is 5% to 50% of the axial length of said valve.

3. A valve as defined in claim 1 wherein said periphery of said cap includes a third conical surface which tapers toward said conical outer surface as it extends away from said inner conical surface, said third conical surface having said second weld connection with a perimeter portion of said outwardly flared portion of said tubular metal member.

4. A valve as defined in claim 1 wherein said cap defines an annular recess for receiving said outwardly flared portion of said hollow metal member.

5. A valve as defined in claim 1 wherein said metal piece has a pair of continuous circumferential grooves in said solid cross-section portion of said metal piece between said first and second ends.

6. A valve as defined in claim 1 further including metallic sodium located in said chamber.

7. A valve as defined in claim 1 wherein said hollow metal member and said metal piece have lengths enabling said first weld connection to always be in the valve guide.

8. An internal combustion engine valve to be reciprocated in a valve guide in an engine, said valve comprising:

a valve stem centered on an axis and comprising first and second parts, said first part comprising a tubular metal member having an outwardly flared first end portion and a second end portion, said tubular metal member having a chamber extending axially throughout said tubular metal member, said chamber comprising a flared chamber portion defined by said first end portion and a cylindrical chamber portion defined by said second portion, said chamber being open at said first end portion and at said second end portion, said tubular metal member being one piece of homogenous material, said second part comprising a metal piece coaxial with said tubular metal member, said metal piece having first and second ends, said first having a first weld connection to said second end portion of said tubular metal member, said metal piece having a second end spaced from said tubular metal member, said metal piece having a solid cross-section portion between said first and second ends, said metal piece having a continuous circumferential groove in said solid cross-section portion, said metal piece being one piece of homogenous material; and a metal cap centered on said axis and coaxial with said tubular metal member, said cap having a periphery and a second weld connection at said periphery to said outwardly flared first end portion of said tubular metal member, said cap closing said flared chamber portion at said flared first end portion and having an inner surface facing into said chamber, said metal cap being one piece of homogenous material;

said tubular metal member and said metal piece being for location in the valve guide and having respective lengths enabling said first weld connection to always be in the valve guide.

9. A valve as defined in claim 8 wherein said metal piece has a pair of continuous circumferential grooves in said solid cross-section portion of said metal piece between said first and second ends.

10. A valve as defined in claim 8 further including metallic sodium located in said chamber.

11. A valve as defined in claim 8 wherein said inner surface of said metal cap is conical in shape and tapers axially away from said tubular member as said inner surface extends from said periphery toward said axis, said cap having an outer surface which is conical in shape and tapers axially away from said tubular metal member as said outer surface extends from said periphery toward said axis.

12. A valve as defined in claim 8 wherein said tubular metal member is a deep drawn part and said outwardly flared first end portion and said second end portion have the same nominal wall thickness throughout their extent.

13. A method of making an internal combustion engine valve to be reciprocated in a valve guide in an engine, said method comprising the steps of:

making a first valve stem part of one piece of homogenous material and comprising a hollow metal member having an outwardly flared first end portion and a second end portion, said hollow metal member having a chamber extending axially throughout said member, said chamber comprising a flared chamber portion defined by said first end portion and a cylindrical chamber portion defined by said second end portion, said chamber being open at said first end portion;

making a second valve stem part which is one piece of homogenous material and comprising a metal piece having first and second ends and having a solid cross-section portion between said first and second ends;

making a continuous circumferential groove in said solid cross-section portion;

welding said first end of said metal piece to said second end portion of said hollow metal member so that said metal piece and said hollow metal member are coaxial, said second end being spaced from said hollow metal member;

making a metal cap of one piece of homogeneous material and having a periphery, an inner surface, and an outer surface, said inner surface being conical in shape and tapering axially away from said hollow metal member as said inner surface extends inward from said periphery, said cap having an outer surface which is conical in shape and tapering axially away from said hollow metal member as said outer surface extends inward from said periphery; and welding said periphery of said metal cap to said outwardly flared first end portion of said hollow metal member to close said flared chamber portion with said inner surface facing into said chamber.

14. A method as defined in claim 13 wherein said step of making a first valve stem part comprises deep drawing a metal disk to form said outwardly flared first end portion and said second end portion with a closed end, and punching out the closed end of said second end portion.

15. A method as defined in claim 13 wherein said step of making a continuous circumferential groove in said solid cross-section portion comprises the step of making at least a pair of continuous circumferential grooves in said solid cross-section portion.

16. A method as defined in claim 13 further including the step of placing metallic sodium in said chamber.

* * * * *